(12) United States Patent
Flores et al.

(10) Patent No.: US 7,746,998 B2
(45) Date of Patent: Jun. 29, 2010

(54) INTEGRATING ENTERPRISE AND PROVIDER CONTACT CENTER RESOURCES TO HANDLE WORKLOAD ON-DEMAND

(75) Inventors: Romelia H. Flores, Keller, TX (US); Jason A. Salcido, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 1256 days.

(21) Appl. No.: 10/923,956

(22) Filed: Aug. 23, 2004

(65) Prior Publication Data

US 2006/0041444 A1 Feb. 23, 2006

(51) Int. Cl.
H04M 3/00 (2006.01)
H04M 5/00 (2006.01)

(52) U.S. Cl. .......................... 379/265.05; 379/265.06; 379/309; 705/1

(58) Field of Classification Search ............ 379/265.05, 379/266.06, 309; 705/1
See application file for complete search history.

(56) References Cited

U.S. PATENT DOCUMENTS

| | | | | |
|---|---|---|---|---|
| 5,787,160 A | * | 7/1998 | Chaney et al. | 379/112.06 |
| 5,914,951 A | | 6/1999 | Bentley et al. | |
| 6,522,743 B1 | | 2/2003 | Hurd | |
| 6,574,605 B1 | | 6/2003 | Sanders et al. | |
| 6,711,255 B2 | * | 3/2004 | Berrondo et al. | 379/266.06 |
| 6,937,715 B2 | * | 8/2005 | Delaney | 379/265.09 |
| 2001/0047270 A1 | | 11/2001 | Gusick et al. | |
| 2003/0163360 A1 | | 8/2003 | Galvin | |
| 2004/0114571 A1 | * | 6/2004 | Timmins et al. | 370/352 |

OTHER PUBLICATIONS

Zeng, L., et al., "On Demand Business-to-Business Integration", 9th Int'l Conf. on Cooperative Info. Systems, CoopIS2001, pp. 403-417, 2001.
Taylor, S., et al., "The Not-So-Centralized Call Center", Network World Convergence Newsletter, Sep. 9, 2003.
"Can IP Technology Revitalize the Contact Center Outsourcing Industry?", TMCnet.com, Oct. 2, 2003.
WorldCom Ultimate Enterprise Architectures: "Web-Enabled Customer Care", Aug. 23, 2004.
WorldCom Ultimate Enterprise Architectures: "Online Customer Contact Centers", Aug. 23, 2004.
WorldCom Ultimate Enterprise Architectures: "Online Customer Care—Executive Intro", Aug. 23, 2004.
"Contact Centers Powered by Intel", Intel Telecom Solutions, Aug. 23, 2004.
"White Pajama—Contact Center on Demand", White Pajama, Knowledgestorm, Inc., 2003.
"eGain eService-Evolve Your Call Center Into a Multi-Channel Contact Center", eGain Communications Corp., 2003.

(Continued)

Primary Examiner—Quynh H Nguyen
(74) Attorney, Agent, or Firm—Novak Druce + Quigg

(57) ABSTRACT

A method for handling contact center requests can include the step of identifying a contact center request and a resource type to handle the request, where a resource of the resource type can be selected from a multitude of contact center resources. The contact center resources can include at least one enterprise resource and at least one provider resource. The request can be handled using the selected resource.

21 Claims, 2 Drawing Sheets

OTHER PUBLICATIONS

Zellen, B., "In iCOD We Trust: Syntellect Turns to HP's iCOD to Provide Hosted Solutions During Customer Spikes", HP World News, Aug. 23, 2004.

"Outsourced Customer Contact Centers", Sento, Inc., 2003.

"Sun and Davox—A Complete Call Center Solution", Sun Front Office Brochures, Aug. 23, 2004.

"ServiceWise", TechExcel, Inc., InfoWorld, 2003.

* cited by examiner

INTEGRATING ENTERPRISE AND PROVIDER CONTACT CENTER RESOURCES TO HANDLE WORKLOAD ON-DEMAND

BACKGROUND

1. Field of the Invention

The present invention relates to the field of software and, more particularly, to a software architecture that automatically manages enterprise and provider contact center resources to handle workload on-demand.

2. Description of the Related Art

Many businesses utilize contact centers to market products, to provide customer support, to enact customer reward programs, to manage customer services and accounts, as well as other business related functions. Contact centers can utilize a variety of limited resources when providing workload support. Limited resources can include human agents, self-service system capacity, communication bandwidth, and the like. An over abundance of contact center resources can be an excessive business expense. Running a contact center with insufficient resources, however, can result in excessive customer wait times that can make using the contact center impractical, or at least frustrating, for many customers.

Establishing proper resources within a call center can be exceptionally difficult. Peak contact center times can require an extensive resource infrastructure that is unnecessarily robust to handle workload experienced at non-peak times. Contact centers can also experience seasonal fluctuations and event triggered fluctuations, such as pre and post sales workload variations and/or post holiday workload surges. Further, many contact center functions, like technical support, can require special skills that may be costly to train and/or obtain.

The different workload levels demanded of call centers have resulted in a number of conventional resource allocation methodologies. One such methodology involves outsourcing at least a portion of call center workflow. Outsourced workflow can occur along functional lines, such as outsourcing all technical support and/or sales functionality. Outsourced workflow can also be based upon workflow volume, where supplemental resources are used to handle special situations, like peak workflow times, holiday workflow, seasonal volume, and the like.

A major problem with this approach is that typically the enterprise and the outsourced contact center resources need to be integrated with one another. This can be extremely challenging. For example, supplemental resources can handle the overflow for multiple contact centers, where each contact center can exhibit different contact center, specific behavior. In another challenging situation, data integration between core center computing resources and supplemental resources can be difficult when the supplemental resources utilize different hardware, software, and/or storage models from the core contact center resources.

Another approach to efficiently handling varying workloads is to implement a "seasonal" approach for staffing the contact center and/or a "seasonal" leasing of contact center resources. The seasonal approach is one where the amount of staff and leased resources within the contact center varies according to a business season. The seasonable approach requires analysis, planning, and workload forecasting by an skilled and knowledgeable administrator. Further, problems with employee turnover, training, and short term lease penalties can result: Moreover, the seasonal approach does not ameliorate problems relating to sporadic workload fluctuations.

SUMMARY OF THE INVENTION

The present invention provides an architecture for handling call center workflow using an integrated system of enterprise and remote call center resources, where the remote call center resources can supplement the enterprise resources to handle workflow surges. That is, one aspect of the present invention can provide an on-demand strategy that permits a call center to focus upon key business areas and leverage resources outside the call center when capacity within the call center has been exhausted. In one embodiment, both enterprise call center resources and remote call center resources can conform to a standardized Services Oriented Architecture (SOA). The SOA can integrate diverse resources implemented utilizing a multitude of contact center technologies, hardware, and software. An automated resource management system conforming to the SOA can dynamically acquire provider resources as needed, thereby permitting the management system to dynamically manage workflow and adjust resources in accordance with workflow in an automated fashion.

One aspect of the present invention can include a method for handling contact center requests. The method can include the step of identifying a contact center request. A resource type to handle the request can be ascertained. A resource of the resource type can be selected from a multitude of contact center resources. The contact center resources can include at least one enterprise resource and at least one provider resource. The request can be handled using the selected resource.

It should be noted that the invention can be implemented as a program for controlling a computer to implement the functions described herein, or a program for enabling a computer to perform the process corresponding to the steps disclosed herein. This program may be provided by storing the program in a magnetic disk, an optical disk, a semiconductor memory, any other recording medium, or distributed via a network.

Another aspect of the present invention can include a resource management system for managing workflow in a contact center. The resource management system can include an enterprise network, an outsourced network, and a resource router. The enterprise network can include one or more dedicated contact center resources for handling requests. The outsourced network can include one or more resources for handling requests for a plurality of different contact centers, where the plurality of contact centers include the contact center associated with the enterprise network. The resource router can receive contact center requests. The router can automatically select resources from among enterprise network resources and outsourced network resources and can utilize the selected resources to handle the received contact center requests.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

Figure 1:
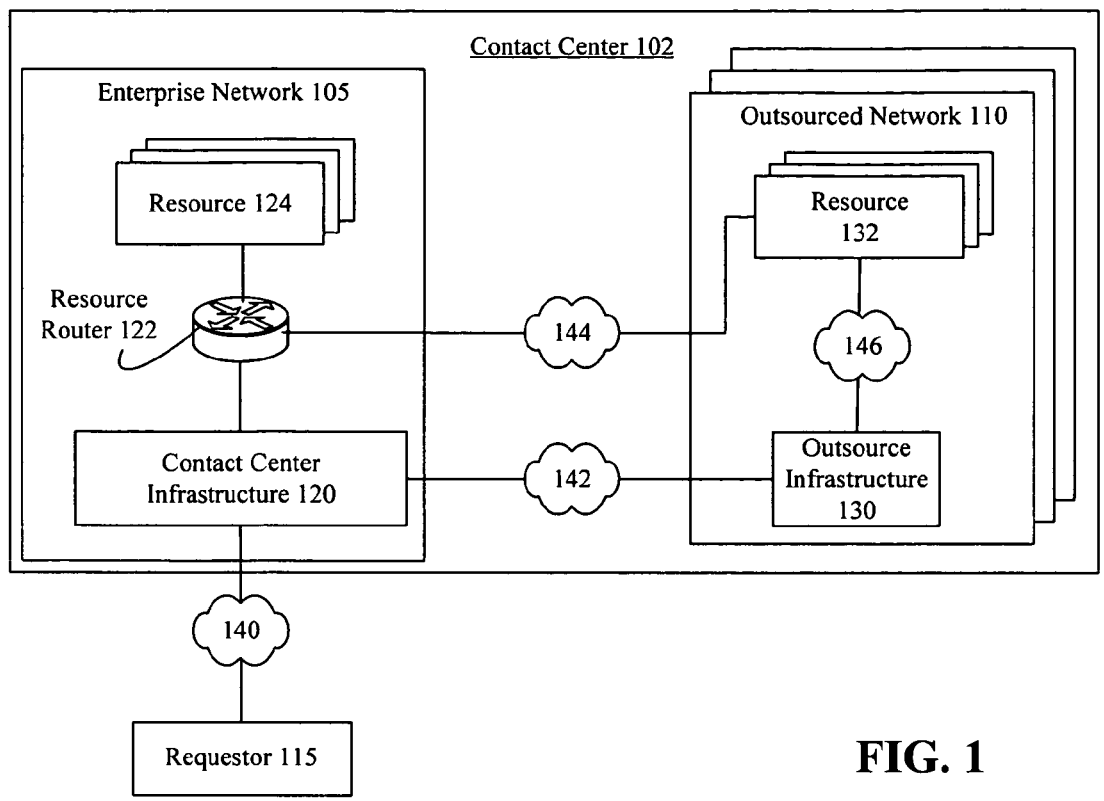
FIG. 1 is a schematic diagram of a system for handling contact center requests using enterprise resources and provider resources in accordance with an embodiment of the inventive arrangements disclosed herein.

FIG. 1 is a schematic diagram of a system 100 for handling contact center requests using enterprise resources 124 and provider resources 132 in accordance with an embodiment of the inventive arrangements disclosed herein. Contact center requests can include product inquires, technical support questions, account questions, shipping requests, sales requests, and the like conveyed to contact center 102 by a requestor 115. The requestor 115 can include a customer, a human customer service agent, an automated routine, and/or any other entity that submits one or more requests to the contact center 102.

The contact center 102 can be a customer service center providing such services as technical support, product support, sales, customer account management functions, operator assistance, and the like for an enterprise, the enterprise being an organization and/or business entity that is supported by the call center 102. The contact center 102 can be used by the enterprise to differentiate themselves from similar entities providing goods and/or services in a competitive market.

For example, the contact center 102 can manage customer loyalty and retention programs, can provide personalized services in accordance with established customer specific preferences. The contact center 102 can be used by sales and marketing segments of the enterprise to directly market products based upon customer metrics and data analysis techniques. The contact center 102 can also provide services over many different communication channels including, but not limited to, telephone channels, video teleconference channels, co-browsing channels, chat channels, e-mail channels, fax channels, broadcast channels, postal mail channels, and Web channels. Additionally, the contact center 102 can provide self-service mechanism like assistance provided through Interactive Voice Response (IVR) systems and/or Web sites, as well as human assisted services.

In responding to requests, the contact center 102 utilizes one or more contact center resources. Each contact center resource can represent a limited asset utilized by a contact center 102 in responding to requests. Resources can include, but are not limited to, computing resources, human agents, and/or physical assets. For example, contact center resources can include an Interactive Voice Response (IVR) system, a live operator, a Web site, a Kiosk, and/or components or portions thereof. Contact center resources can include enterprise resources 124 and provider resources 132.

Each enterprise resource 124 can be a resource of an enterprise network 105. The enterprise network 105 can include a logical network of communicatively linked enterprise owned and/or controlled assets. Each provider resource 132 can be a resource of an outsourced network 110. The outsourced network 110 can include assets not directly owned and/or controlled by the enterprise, but instead owned by a resource provider. The enterprise network 105 can utilize provider resources 132 from one or more outsourced networks 110. Each outsourced network 110 can provide resources to one or more enterprise networks 105.

The enterprise network 105 can include a contact center infrastructure 120, a resource router 122, and at least one enterprise resource 124. The contact center infrastructure 120 can include communication hardware, software, database, people, and policies supporting the information management functions of the enterprise. The contact center infrastructure 120 can record and retrieve requestor and product specific information needed in handling the requests. In one embodiment, the contact center infrastructure 120 can monitor enterprise resource 124 availability, triggering the resource router 122 to utilize provider resources 132 when corresponding enterprise resources 124 are not available.

The resource router 122 can allocate resources for requests accordingly to previously established rules. More than one resource can be allocated by the request router 122 per request in a parallel or sequential manner. For example, one of the enterprise resources 124 can be an Interactive Voice Response (IVR) system and one of the provider resources 132 can be a speech recognition engine used by the IVR system when performing speech recognition tasks. Accordingly, the IVR system (enterprise resource 124) and the speech recognition engine (provider resource 132) can be allocated in a parallel manner.

The enterprise network 105 can include a contact center infrastructure 120, a resource router 122, and at least one enterprise resource 124. The contact center infrastructure 120 can include communication hardware, software, database, people, and policies supporting the information management functions of the enterprise. The contact center infrastructure 120 can record and retrieve requestor and product specific information needed in handling the requests. In one embodiment, the contact center infrastructure 120 can monitor enterprise resource 124 availability, triggering the resource router 122 to utilize provider resources 132 when corresponding enterprise resources 124 are not available. The exemplary embodiments can include enterprise resources and functionally equivalent provider resources utilizing a common contact center infrastructure when handling the request.

In a sequential resource allocation example, the enterprise resource 124 and the provider resource 132 can be live operators, with the enterprise resource 124 being a support technician or other specialized customer service operator and the provider resource 132 being a generic customer service operator. In such an example, a request can initially be routed by the resource router 122 to the generic customer service operator (provider resource 132), in accordance with previously established rules. The operator can determine that a support technician is needed to handle the request and responsively connect the requestor 115 to a technical support agent (enterprise resource 124).

The resource router 122 can use rules based upon static or dynamic conditions. In one embodiment, the resource router 122 can dynamically allocate resources based upon availability of enterprise resources 124. That is, when an availability level is under a predetermined threshold, such as less than one minute wait time, one of the enterprise resources 124 can be allocated to handle a request. When availability is over the predetermined threshold, one of the provider resources 124 can be allocated to the request. In another embodiment, the resource router 122 can alternate calls between enterprise resources 124 and provider resources 132 having a corresponding resource type. For example, every even incoming request can be routed to an enterprise resource 124 and every odd incoming request can be routed to the provider resource 132, thereby creating a fifty percent split between enterprise resource 124 utilization and provider resource 132 utilization. It should be appreciated that above examples are for illustrative purposes only, and that the resource router 122 can utilize any expressible programmatic rules to allocate resources to requests.

In a particular embodiment, the outsourced network 110 can include an outsource infrastructure 130 and at least one provider resource 132. The outsource infrastructure 130 can include communication hardware, software, database, people, and policies supporting the information management functions of the outsourced network 110. The outsourced infrastructure 130 must be designed in a fashion that the outsourced infrastructure 130 can access data from the contact center infrastructure 120. The outsourced infrastructure 130 need not, however, utilize the same hardware and/or software platform as the contact center infrastructure 120, nor need it follow the same conventions as those followed by the contact center infrastructure 120.

In operation, the requestor 115 can convey a request via network 140 to the contact center infrastructure 120. The request can be analyzed to determine a request type. For example, the request type can include an operator request, a sales request, a technical support request, and the like. The resource router 122 can allocate one or more resources of appropriate resource types to handle the request. The allocated resources can include enterprise resources 124 and/or provider resources 132. Enterprise resources 124 and provider resources 132 can both access the contact center infrastructure 120 when handling requests. The utilization of an enterprise resource 124 and/or providers resource 132 can occur in a manner transparent to the requestor 115.

In one embodiment, multiple communication connections can simultaneously exist between the enterprise network 105 and the outsourced network 110. For example, a telephone link can be established between the provider resource 132 and the requestor 115 across networks 144 and 140, where the requestor 115 can be a customer and the provider resource 132 can be a live agent. The live agent can utilize a computer system to gather and/or record requestor-specific information while speaking to the requestor 115. The computer system used by the live agent can represent a provider resource 132 that is linked to the contact center infrastructure 120 via networks 146 and 142.

It should be noted that networks 140, 142, 144, and 146 can be implemented as any of a variety of fashions so long as content is conveyed using encoded electromagnetic signals. Further, any of a variety of communication devices, such as customer premise equipment (CPE), computers, modems, routers, switches, and the like, can be included within networks 140, 142, 144, and/or 146. These communication devices can facilitate communications between the various communicatively linked entities shown in FIG. 1.

Each of the networks 140, 142, 144, and 146 can convey content in a packet-based or circuit-based manner. Additionally, each of the networks 140, 142, 144, and 146 can convey content via landlines or wireless data communication methods. For example, each of the networks 140, 142, 144, and/or 146 can separately include an Intranet, an Internet, a local area network, a wide area network, or a combination thereof. In another example, each of the networks 140, 142, 144, and/or 146 can include a telephony network, like a mobile wireless network or a public switched telephone network (PSTN).

It should also be noted that the term enterprise resource 124 as used herein signifies that the resource is owned and/or controlled by a business entity or organization. The contact center 102 is implemented for this business entity or organization. The enterprise network 105 signifies a logical network and does not necessarily signify a physical network. Accordingly, enterprise resources 124 can be distributed across different physical network spaces.

Similarly, the provider resource 132 refers to a resource that is not directly owned or controlled by the enterprise. Therefore, a provider resource 132 is part of the outsourced network 110, which is a defined as a logical network and not a physical network. Accordingly, provider resources 124 can be located within the same physical network space as enterprise resources 132 and/or can be distributed across different physical network spaces.

It should be appreciated that the arrangements shown in FIG. 1 are for illustrative purposes only and that the invention is not limited in this regard. The functionality attributable to the various components can be combined or separated in different manners than those illustrated herein. For instance, the resource router 122 can be implemented as a component integrated within the contact center infrastructure 120.

Figure 2:
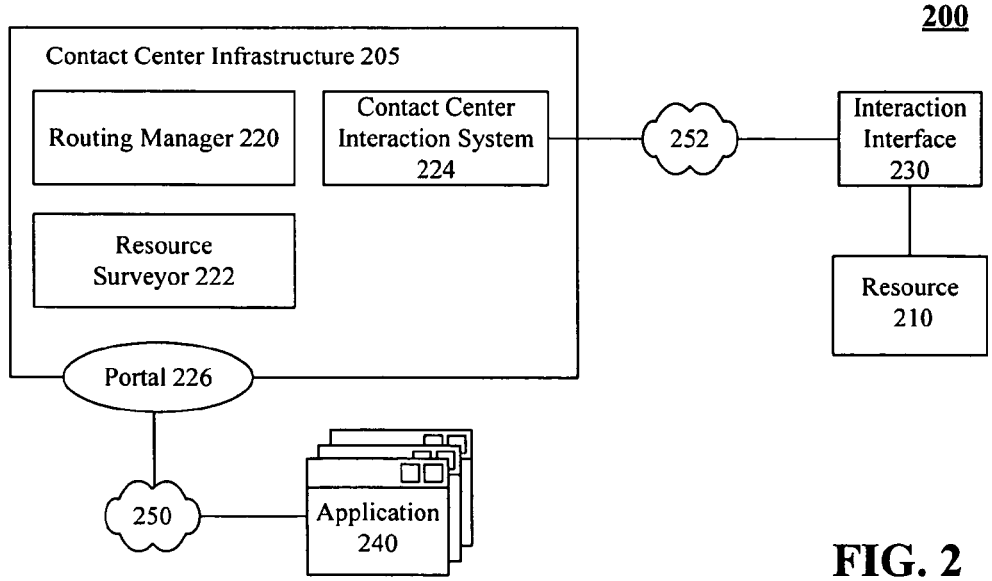
FIG. 2 is a schematic diagram of a system for communicating between a contact center infrastructure and a resource in accordance with an embodiment of the inventive arrangements disclosed herein.

FIG. 2 is a schematic diagram of a system 200 of a Services Oriented Architecture (SOA) for a contact center in accordance with an embodiment of the inventive arrangements disclosed herein. The SOA can integrate diverse call center resources provided by different service providers and implemented upon different hardware and software platforms into an integrated call center environment. The SOA can allocate resources on demand based upon request type, resource availability, workload, and other such workload based, service-oriented criteria. The SOA of system 200 includes a contact center infrastructure 205. In one embodiment, the contact center infrastructure 205 can represent the contact center infrastructure 120 of FIG. 1. In another embodiment, the resource 210 can represent an enterprise resource 124 as well as a provider resource 132 of FIG. 1.

The contact center infrastructure 205 can record, retrieve, analyze, and manage all contact center information. Contact center information can include customer information, product data, resource data, business data, and the like. That is, the contact center infrastructure 205 can provide support for the appropriate routing of incoming customer requests to appropriate resources, where resources can be provided by an enterprise or a resource provider. The contact center infrastructure 205 can include configuration and logic to handle incoming request in an automated fashion. Further, the contact center infrastructure 205 can maintain information as to the length of contact center interactions and log this information for administrative, marketing, and system optimization purposes.

The contact center infrastructure 205 can utilize one or more applications 240, Web services, or other routines from across a network 250 via a portal 226. The applications 240 can provide specific application functions used by the contact center. For example, an application 240 within a Financial Enterprise can include an Automatic Teller Machine (ATM) server that provides ATM functions. In another example, the application 240 can provide callback and queuing services for the contact center.

The contact center infrastructure 205 can include a routing manager 220, a resource surveyor 222, and a contact center interaction system 224. The routing manager 220 can establish, modify, and store a multitude of rules for routing requests to resources. Rules can be based upon fixed and/or dynamic conditions. Rules can be optimized for different criteria, such as cost, quality of response, speed of response, and the like. Further, rules can be deterministic or heuristic in nature.

In one embodiment, the routing manager 220 can include an administrator interface and/or a learning engine. The administrator interface can permit an authorized administrator to view current and historical data about routing call center requests. The administrator interface can also permit the administrator to adjust one or more thresholds that determine the manner in which resources are allocated to requests. The learning engine can automatically adjust routing rules based upon requestor feedback, administrator preferences, desired outcomes, historical data, and/or the like.

The resource surveyor 222 can determine present workload and available capacity of resources that can be used to handle requests. The resource surveyor 222 can monitor resources provided by a multitude of different resource providers, regardless of whether the provider is directly affiliated with the contact center. Data determined by the resource surveyor 222 can be compared against thresholds and/or other criteria used by the routing manager 220 to responsively allocate resources to request.

The contact center interaction system 224 can represent a standardized interaction mechanism for conveying data to and from the contact center infrastructure 205. As such, the contact center interaction system 224 can be a key touch point for providing data to the resources 210, such as a customer service representative. The contact center interaction system 224 can provide the resource 210 with all pertinent data in a secure and platform independent fashion in accordance with standardized data conventions and messaging protocols.

In one embodiment, the contact center interaction system 224 can be a defined application program interface (API) for the contact center infrastructure 205. In another embodiment, the contact center interaction system 224 can define a series of exposed methods, functions, and/or classes for interfacing with the contact center infrastructure 205. In another embodiment, the contact center interaction system 224 can represent a server-side component that interacts with a client-side interaction interface 230.

The interaction interface 230 can convey data between the contact center infrastructure 205 and the resource 210 across network 252, where the resource 210 can be either an enterprise resource 124 or a provider resource 132 as defined above in FIG. 1. Notably, the interaction action interface 230 can be an abstracted interface written in a platform independent manner. For example, the interaction interface 230 can convey data between the resource 210 and the contact center infrastructure 205 using a standardized messaging protocol, such as Simple Object Access Protocol (SOAP) or other Web messaging protocol.

The interaction interface 230 can be a stand-alone interface or can be integrated into another software application used by a resource 210 providing source. For example, the interaction interface 230 can be a standardized Web page or page segment included within a Web-based application used by the resource 210 to interact with the contact center infrastructure 205. That is, the interaction interface 230 can be a Web portal that provides access to contact information across a packetized network like the Internet. In another example, the interaction interface 230 can be a back-end interface for a multitude of different front-end applications utilized by the resource 210.

Figure 3:
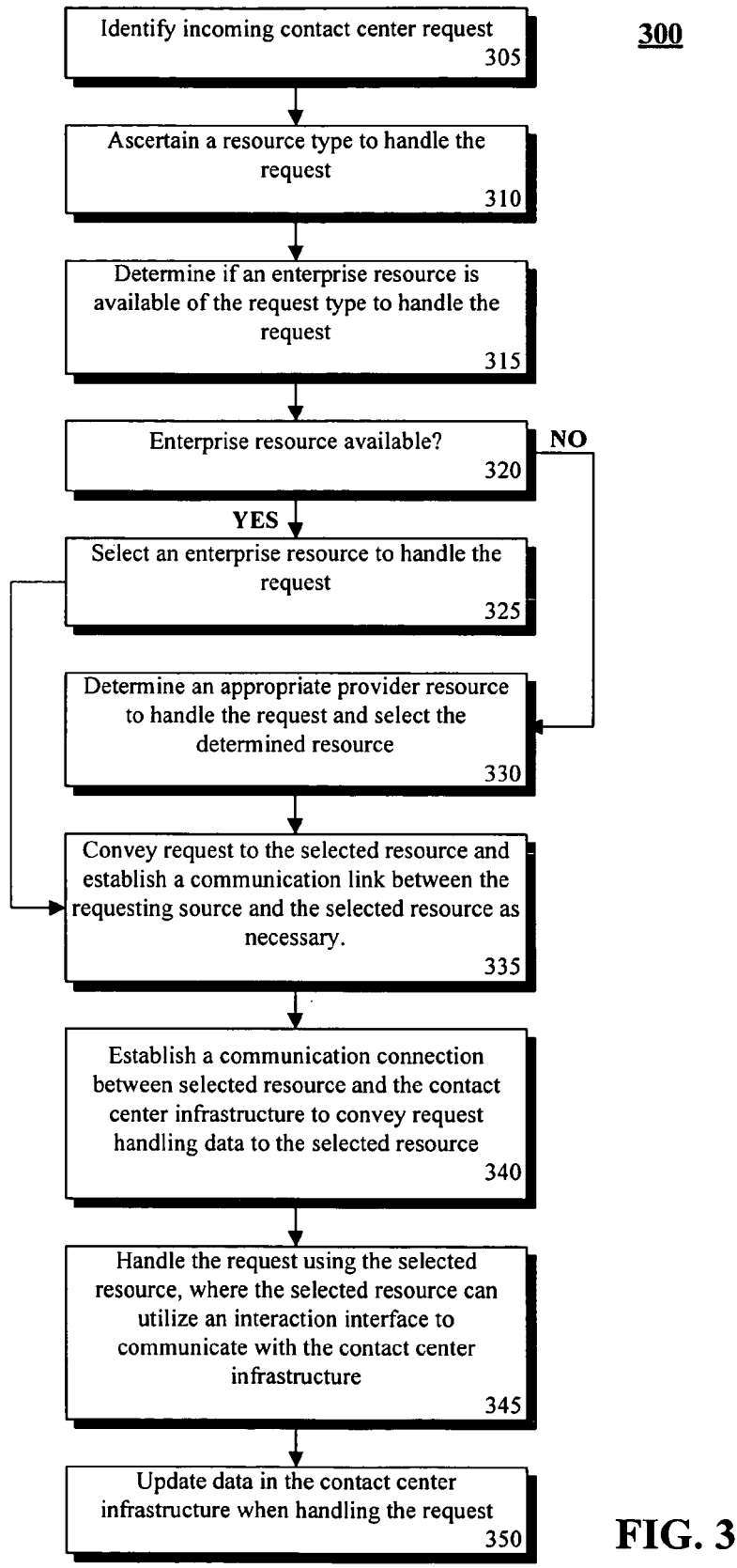
FIG. 3 is a flow chart illustrating a method for handling contact center requests in accordance with an embodiment of the inventive arrangements disclosed herein.

FIG. 3 is a flow chart illustrating a method 300 for handling contact center requests in accordance with an embodiment of the inventive arrangements disclosed herein. In one embodiment, the method 300 can be performed in the context of the system 100 of FIG. 1. The method 300, however, is not limited in this regard and can be utilized in the context of any contact center configured to handle requests using enterprise resources dedicated to the contact center and provider resources provided by an outsourced provider. In one arrangement, the provider resources can be used on demand to supplement the enterprise resources when handling workflow.

The method 300 can begin in step 305, where an incoming contact center request can be identified. A resource type for handling the request can be ascertained. Any of a variety of request types can exist such that the request type helps the contact center to properly route the request.

For example, one request type can indicate whether a human agent or an automated system should handle the request. In another example, the request type can indicate the type of communication channel for handling the request, such as telephone, teleconference, fax, email, co-browsing, postal mail, and the like. In still another example, the request type can indicate a functional area of the contact center, such as technical support, billing, product information, sales, and the like. It should be noted that ascertaining the resource type can involve prompting the requesting source for preliminary request information, using a human agent and/or an automated system, like an IVR system.

In step 315, a determination can be made as to whether an enterprise resource is available to handle the request. In step 320, when an enterprise resource is available, the method can proceed to step 325, where an enterprise resource can be selected to handle the request. When an enterprise request is not available, the method can proceed from step 320 to step 330. In step 330, an appropriate provider resource for handling the request can be determined. This determination can select one or more resources from one or more outsourced resource providers based upon any suitable criteria, such as cost, quality, resource availability, and the like. In step 335, the request can be conveyed to the selected resource. In one embodiment, a communication session can be established between the requester and the resource at this point.

Additionally, as shown in step 340, a communication connection can be established between the selected resource and the contact center infrastructure to convey request handling data to the selected resource. For example, if the selected resource is a human agent a telephone call can be established between the requestor and the selected agent. In step 345, the request can be handled using the selected resource. In one embodiment, the selected resource can utilize an interaction interface to communicate with the contact center infrastructure. In step 350, the selected resource can update data in the contact infrastructure when handling the request.

It should be noted that the method 300 can utilize either a dynamic or a fixed methodology for routing requests to resources. That is, in one embodiment, an automated routing system based upon a series of previously established criteria can be utilized to route request. In such an embodiment, a series of thresholds can be established against enterprise resources and availability can be determined by comparing the load of enterprise resources against these thresholds. For example, a wait time before an enterprise resource is available to handle the request can be estimated. When the estimated wait time exceeds a previously established time threshold, the enterprise resource can be considered unavailable.

In another embodiment, an administrator of the request routing system can establish a configuration of relatively fixed, yet administrator modifiable, rules for routing requests. For example, during a peak season a contact center may be provisioned to internally handle fifty percent of expected requests. In such an example, the request routing system can be configured to alternate calls between enterprise resources and provider resources.

In another example, different configurations can exist for different times of day assuming workload varies accordingly to the time of day. That is, from 8 am to 10 am, a configuration can be automatically activated that routes all calls to enterprise resources. A different configuration that routes sixty percent of calls to provider resources and forty percent to enterprise resources can be automatically activated from 12 am to 1 pm, when lunchtime results in increased customer requests. In one embodiment, administrators managing the enterprise resources can be permitted to override configuration settings based upon actual workload. It should be appreciated, however, that the routing of resources is not to be limited to any particular methodology and that any routing technique can be utilized.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method for handling contact center requests comprising the steps of:
   providing a resource management system having a computer for managing workflow in a particular contact center configured to handle requests for a particular enterprise using enterprise resources dedicated to the contact center and provider resources provided by an outsourced provider, wherein the provider resources are used on demand to supplement the enterprise resources when handling workflow, wherein the resource management system is within the contact center, wherein the enterprise resources and the provider resources are associated with different business entities and implemented upon different hardware and software platforms, wherein the enterprise resources and the provider resources are integrated through Services Oriented Architecture (SOA) interfaces;
   configuring the computer having at least one memory and at least one processor to carry out the steps of:
      identifying a contact center request that is received at the contact center having a contact center infrastructure;
      ascertaining a resource type to handle the request;
      selecting a resource of the resource type from the enterprise resources and the provider resources, the selecting step including:
         determining if an enterprise resource of the resource type is available to handle the request;
         if an enterprise resource of the resource type is available, selecting the enterprise resource to handle the request; and
         if no enterprise resource of the resource type is available, determining an appropriate provider resource of the resource type for handling the request; and
      handling the request using the selected resource, wherein the provider resource accesses data from the contact center infrastructure on demand based on the request to handle the request when the selected resource is the provider resource.

2. The method of claim 1, said determining step further comprising the steps of:
   estimating a wait time before an enterprise resource is available to handle the request; and
   comparing the estimated wait time to a previously established threshold, wherein availability of the enterprise resource is based at least in part upon the comparing step.

3. The method of claim 1, wherein the resource type is a human being, and wherein the plurality of contact center resources include a plurality of human agents.

4. The method of claim 3, wherein each enterprise resource of the resource type is part of a dedicated staff employed by an enterprise affiliated with the contact center to which the request was directed, and wherein the provider resource of the resource type is part of a staff of outsourced agents not directly employed by the enterprise.

5. The method of claim 1, wherein the provider resource handles the request independent of the enterprise resource when the selected resource is the provider resource.

6. The method of claim 5, further comprising the step of:
   conveying data between the selected resource and the common contact center infrastructure and an interaction interface used by the selected resource, wherein the interaction interface is a standardized interface for communicating with the contact center infrastructure.

7. The method of claim 5, further comprising performing the selection of the resource step based upon a condition associated with the contact center.

8. The method of claim 7, wherein the condition comprises at least one of availability and workload.

9. The method of claim 1, further comprising performing the selection of the resource step by utilizing the provider resource when availability of the provider resource is below a previously established threshold.

10. A computer-implemented system for handling contact center requests comprising:
    a contact center configured to handle requests for a particular enterprise using enterprise resources dedicated to the contact center and provider resources provided by an outsourced provider, wherein the provider resources are used on demand to supplement the enterprise resources when handling workflow, wherein the enterprise resources and the provider resources are associated with different business entities and implemented upon different hardware and software platforms, wherein the enterprise resources and the provider resources are integrated through Services Oriented Architecture (SOA) interfaces;
    a resource management system in the contact center, the resource management system having a computer for managing workflow in the contact center, the computer having at least one memory and at least one processor, the computer being configured to:
       identify a contact center request that is received at the contact center having a contact center infrastructure;
       ascertain a resource type to handle the request;
       select a resource of the resource type from the enterprise resources and the provider resources wherein if it is determined that an enterprise resource of the resource type is available to handle the request, the enterprise resource is selected to handle the request, and if no enterprise resource of the resource type is available, an appropriate provider resource of the resource type is determined for handling the request; and handle the request using the selected resource, wherein the provider resource accesses data from the contact center infrastructure on demand based on the request to handle the request when the selected resource is the provider resource.

11. The system of claim 10, wherein resources are dynamically selected based upon an availability of enterprise network resources.

12. The system of claim 11, wherein enterprise network resources are utilized to handle requests when the availability is above a previously established threshold, and wherein outsourced resources are utilized to handle requests when the availability is below a previously established threshold.

13. The system of claim 10, wherein a percentage of received contact center requests are routed to the enterprise network resources and a percentage of received contact center requests are routed to the outsourced network resources in accordance with a previously established router configuration.

14. The system of claim 13, wherein a plurality of configurations are established for the system, wherein one of the configurations is selectively activated based upon at least one of a time of day, a day of the week, and a contact center season.

15. The system of claim 10, wherein the resource management system further comprises:

a contact center infrastructure comprising hardware and software for handling contact center requests, wherein the contact center infrastructure is accessible by enterprise network resources and outsourced network resources.

16. The system of claim 15, wherein the contact center infrastructure includes a contact center interaction system configured as a standardized interface to the hardware and software of the contact center infrastructure for enterprise network resources and outsourced network resources.

17. The system of claim 16, wherein enterprise network resources and outsourced network resources interact with the contact center infrastructure via a standardized interaction interface.

18. The system of claim 17, wherein outsourced network resources access the contact center infrastructure via an outsource infrastructure, wherein the interaction interface is an integrated component of the outsource infrastructure.

19. The system of claim 15, wherein the selected resource includes a human agent, wherein a real-time communication link is established between a requesting source and the human agent, and wherein the human agent utilizes a computing device to access the contact center infrastructure while communicatively linked to the requesting source.

20. A computer-readable medium having stored thereon, a computer program having a plurality of code sections, said code sections executable by a computer of a resource management system for managing workflow in a contact center for causing the computer to perform the steps of:

providing a particular contact center configured to handle requests for a particular enterprise using enterprise resources dedicated to the contact center and provider resources provided by an outsourced provider, wherein the provider resources are used on demand to supplement the enterprise resources when handling workflow, wherein the resource management system is within the contact center, wherein the enterprise resources and the provider resources are associated with different business entities and implemented upon different hardware and software platforms, wherein the enterprise resources and the provider resources are integrated through Services Oriented Architecture (SOA) interfaces;

identifying a contact center request that is received at the contact center having a contact center infrastructure;

ascertaining a resource type to handle the request;

selecting a resource of the resource type from the enterprise resources and the provider resources, the selecting step including:

determining if an enterprise resource of the resource type is available to handle the request;

if an enterprise resource of the resource type is available, selecting the enterprise resource to handle the request; and if no enterprise resource of the resource type is available, determining an appropriate provider resource of the resource type for handling the request; and handling the request using the selected resource, wherein the provider resource accesses data from the contact center infrastructure on demand based on the request to handle the request when the selected resource is the provider resource.

21. The computer-readable medium of claim 20, wherein the enterprise resources and the provider resources utilize a common contact center infrastructure when handling the request.

* * * * *